United States Patent [19]

Auslander et al.

[11] Patent Number: 4,589,087
[45] Date of Patent: May 13, 1986

[54] CONDITION REGISTER ARCHITECTURE FOR A PRIMITIVE INSTRUCTION SET MACHINE

[75] Inventors: Marc A. Auslander, Millwood; John Cocke, Bedford; Hsieh T. Hao, Chappaqua; Peter W. Markstein, Yorktown Heights; George Radin, Piermont, all of N.Y.

[73] Assignee: International Business Machines Corporation, Armonk, N.Y.

[21] Appl. No.: 509,744

[22] Filed: Jun. 30, 1983

[51] Int. Cl.⁴ ............................................. G06F 7/48
[52] U.S. Cl. .................................................. 364/768
[58] Field of Search ............... 364/768, 781, 783, 756, 364/763

[56] References Cited

U.S. PATENT DOCUMENTS 4,245,327 1/1981 Moriya et al. ...................... 364/768
4,384,341 5/1983 Tague et al. ......................... 364/763
4,484,300 11/1984 Negi et al. ........................... 364/756

*Primary Examiner*—David H. Malzahn
*Attorney, Agent, or Firm*—Roy R. Schlemmer

[57] ABSTRACT

A mechanism including an expanded condition register for use in a reduced instruction set computing system which facilitates the performance of single machine cycle instructions on the system and further provides for the efficient execution of more complex instructions which are not susceptible of being completed in a single machine cycle. More particularly, a mechanism is provided for setting the bits of the expanded condition register whereby a more efficient restart is possible after a machine interrupt and whereby the results of intermediate operations of certain multistep logic and arithmetic operations are maintained in the condition register in order that the cycle time of such multistep operations may be kept to a minimum, and when necessary, may be executed with greater efficiency. Still more particularly, the condition register architecture provides for the efficient handling of multiply and divide operations and provides for the more efficient execution of certain decimal operations within such a reduced instruction set host computer system.

11 Claims, 5 Drawing Figures

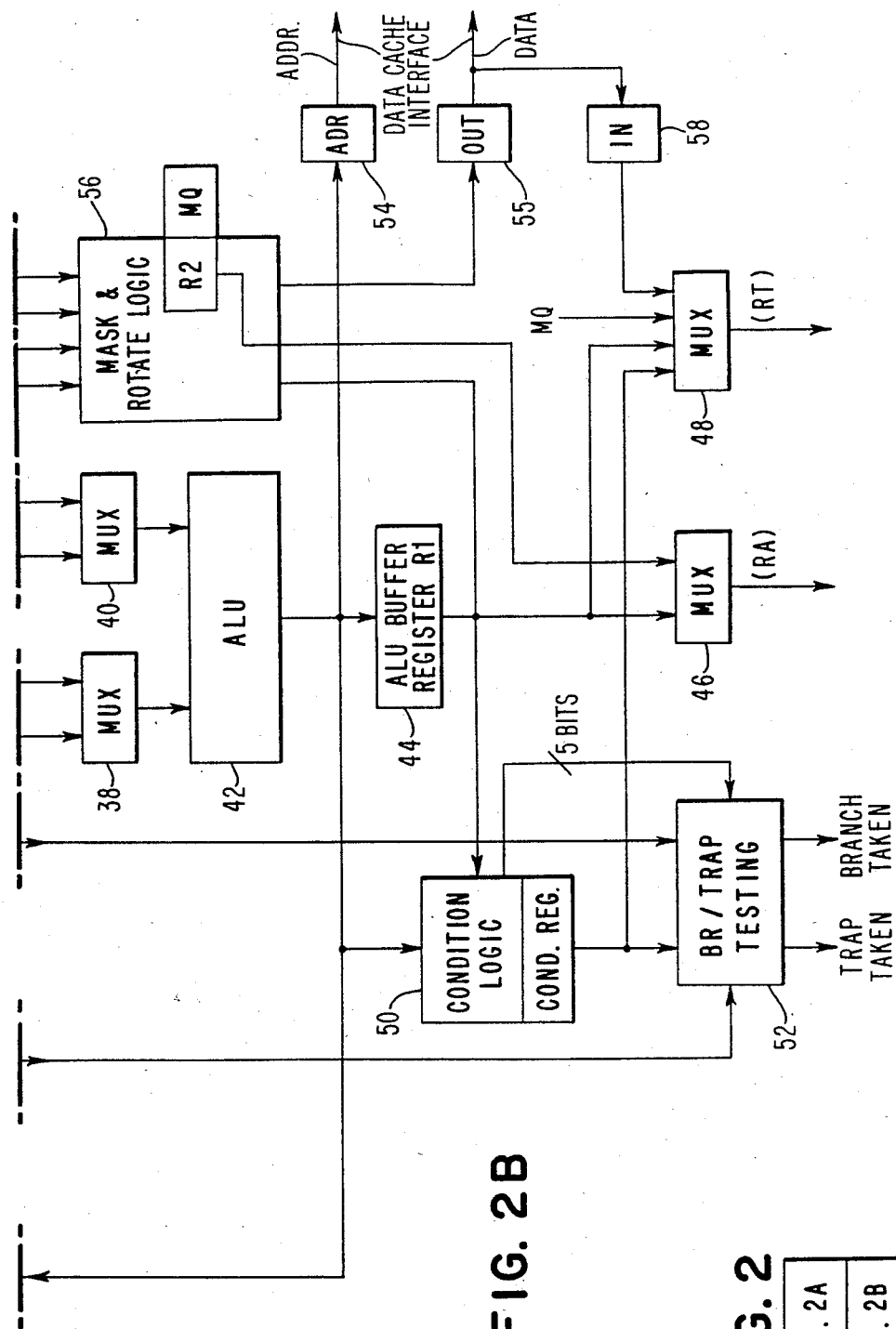

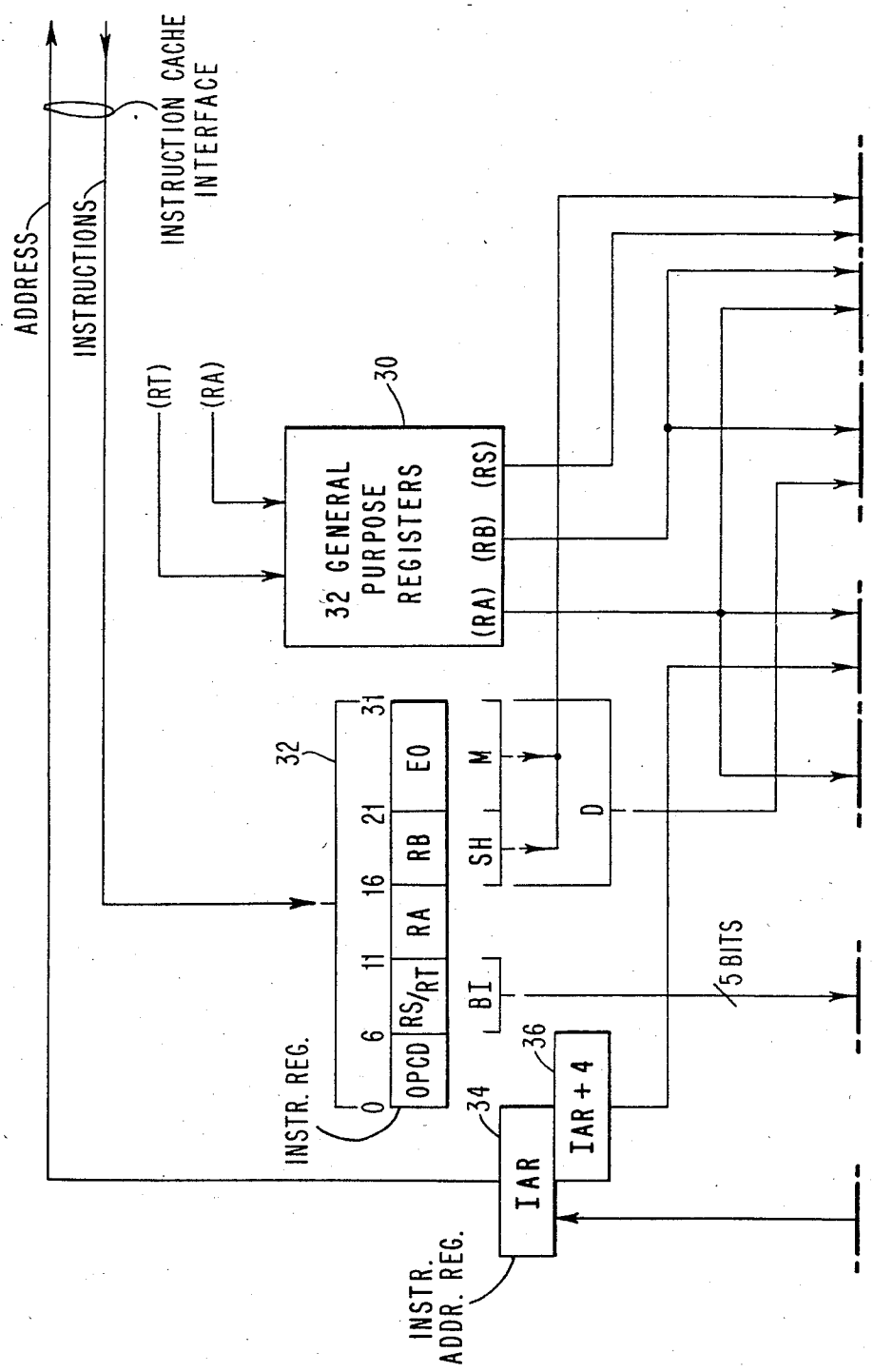

CONDITION REGISTER ARCHITECTURE FOR A PRIMITIVE INSTRUCTION SET MACHINE

BACKGROUND OF THE INVENTION

1. Field of the Invention

The present invention has particular utility in a reduced instruction set computer architecture, two examples of which are described in considerable detail, as to their basic architectural features as well as overall design consideration, in the two articles (1) "The 801 Minicomputer," by George Radin and (2) "RISC I: A reduced Instruction Set VLSI Computer," by Patterson and Sequin. The complete bibliographic data for these two articles is set forth more fully in the subsequent Prior Art section.

Current developments in the semiconductor industry indicate that very large-scale integration (VLSI) affords microprocessor designers two conflicting approaches to designing future systems. The first is that they can continue the current trend, where VLSI is used to build increasingly complex microprocessors, where greater complexity is exhibited as more hardware to do functions previously done by software alone. Alternatively, they can take the opposite approach and build simpler, very fast processors, where more functions are done by software. This second approach is exemplified in the two above-referenced articles.

Greater complexity lets designers use ever-cheaper VLSI circuits in place of increasingly expensive and processor time consuming software. What's more, the takeover of many software functions by hardware is said to help programmers develop high-level language (HLL) programs that are shorter, more efficient, and easier to write, compile and debug. More complex systems would, in theory, reduce the high cost of developing software and thus reduce the total life-cycle cost of a system.

Thus, system designers following the first approach, increase the complexity of architectures commensurate with the increasing potential of implementation technologies, as exemplified by the complex successors of simpler machines. Compare, for example, VAX 11 to PDP-11, IBM System/38 to IBM System/3, and Intel APX-432 to 8086. The consequences of this complexity are increased design time, an increased potential for design errors and inconsistent implementations. This class of computers has been referred to in the literature as complex instruction set computing (CISC) systems.

As indicated previously in the above referenced article "The 801 Minicomputer" by G. Radin a coinventor of the present invention, a unique approach to overall CPU architecture has been realized following the second of the two previously mentioned approaches to architecture design, i.e., a reduced instruction set computer. The heart of such a system architecture is its CPU. Most of the aspects of this system are designed to make available to the user the fundamental power of the underlying CPU. The overall organization is somewhat different from more conventional CPUs.

There will now follow a brief overall description of the CPU design strategy utilized in the CPU of the Radin article followed by a more specific description of the details of the CPU insofar as is deemed necessary to provide a basis for understanding how the present invention fits into the overall system architectural scheme.

Conventional CPUs for general purpose systems in the middle range of cost are organized as hardwired microprocessors "interpreting" the architecture of the CPU. Thus the execution of a CPU instruction normally requires the execution of several "microinstructions" which normally reside in a high-speed memory called a "control store." The number of such microinstructions (or "machine cycles") required to execute an average CPU instruction depends on the power (hence cost) of the underlying microprocessor, the complexity of the CPU architecture, and the application being run (i.e., the instruction mix). Typically, for instance, an IBM S/370 model 168 will require 3-6 cycles per S/370 instruction, a model 148 will take 10-15 and a S/360 model 30 will need over 30 cycles.

Very sophisticated S/370 CPU designs have demonstrated the possibility of approaching one machine cycle per instruction by using techniques of look-ahead, parallel execution and keeping branch histories.

Instruction mixes for different application types show differences in frequency of execution of instructions. For instance, scientific applications will use the S/370 floating point instructions and commercial applications will use decimal arithmetic. But, especially when an entire running system is traced instead of just the application code, there is a remarkable similarity in the list of most popular instructions. Moreover, these tend to be rather simple functions, such as load, store, branch, compare, integer arithmetic, logic shifting. These same functions generally are found to be in the instruction repertoire of the underlying microprocessor. Thus, for these functions, it was considered wasteful to pay the interpretive overhead necessary when the micro-architecture does not precisely match the CPU architecture.

Therefore, the primitive instruction set designed for the subject primitive reduced instruction set machine system may be directly executed by hardware. (In the subsequent description, the acronym PRISM will be used instead of the full expression PRimitive Instruction Set Machine for convenience of reference.) That is, every primitive instruction takes exactly one machine cycle. Complex functions are implemented in "microcode" just as they are in conventional CPUs, except that in the present system this microcode is just code; that is, the functions are implemented by software subroutines running on the primitive instruction set.

The advantages of micro-code that accrue because it resides in high-speed control store virtually disappears with a memory hierarchy in which the cache is split into a part that contains data and a part that contains instructions. The instruction cache acts as a "pageable" control store because frequently-used functions will, with very high probability, be found in this high-speed memory. The major difference is that in a conventional CPU the architect decides in advance which functions will most frequently be used across all applications. Thus, for instance, double precision floating point divide always resides in high speed control store while the First Level Interrupt Handler may be in main memory. With an instruction cache it is recent usage that decides which functions will be available more quickly.

With this approach, the number of cycles required to do a particular job is at worst no more than on a conventional (low-to-moderately priced) CPU in which the complex instructions have been microprogrammed. But by carefully defining the primitive instructions to be an excellent target machine for the compiler, it has been found that far fewer cycles are actually required. In fact, for systems programs, fewer instructions are required than S/370 instructions.

Most instruction mixes show that between 20% and 40% of instructions go to storage to send or receive data, and between 15% and 30% of instructions are branches. Moreover, for many applications, a significant percent of the memory bandwidth is taken for I/O. If the CPU is forced to wait many cycles for storage access its internal performance will be wasted.

The second major goal of the present (PRISM) system design, therefore, was to organize the storage hierarchy and develop a system architecture to minimize CPU idle time due to storage access. First, it was clear that a cache was required whose access time was consistent with the machine cycle of the CPU. Secondly a "store-in-cache" strategy was used (instead of "storing through" to the backing store) so that the 10% to 20% of expected store instructions would not degrade the performance severely. (For instance, if the time to store a word is ten cycles, and 10% of instructions are stores, the CPU will be idle about half the time unless it can overlap execution of the instructions following the store.) But a CPU organization which needs a new instruction at every cycle as well as accessing data every third cycle will be degraded by a conventional cache which delivers a word every cycle. Thus the cache was split into a part containing data and a part containing instructions. In this way the bandwidth to the cache was effectively doubled and asynchronous fetching of instructions and data from the backing store was permitted.

Conventional architectures make this decision difficult because every store of data can be a modification of an instruction, perhaps even the one following the store. Thus the hardware must ensure that the two caches are properly synchronized, a job that is either expensive or degrading, or (generally) both. Even instruction prefetch mechanisms are complex since the effective address of a store must be compared to the Instruction Address Register.

It has been found, however, that as soon as index registers were introduced into computers the frequency of instruction modification fell dramatically, until today, instructions are virtually never modified. Therefore, the PRISM architecture does not require this hardware broadcasting. Instead it exposes the existence of the split cache and provides instructions by which software can synchronize the caches when required, which is only in such functions as "program fetch."

Similarly, in conventional systems in which the existence of a cache is unobservable to the software, I/O must (logically) go through the cache. This is often accomplished in less expensive systems by sending the I/O physically through the cache. The result is that the CPU must wait while the I/O proceeds, and that after an I/O burst the contents of the cache no longer reflect the working set of the process being executed, forcing it back into transient mode. Even in expensive systems a broadcasting or directory-duplication strategy may result in some performance degradation.

It was noted that responsibility for the initiation of I/O in current systems was evolving toward system access methods using fixed block transfers and a buffer strategy which normally moved data between subsystem buffers and user areas (e.g., IMS, VTAM, VSAM, paging). This implies that the access method knows the location and extent of the buffer and knows when an I/O transfer is in process. Thus this software can properly synchronize the caches, and the "channel" (Direct Memory Adapter in the PRISM system) can transmit directly to and from the backing store. The result of this system approach is that even when half of the memory bandwidth is being used for I/O the CPU is virtually undegraded.

Notice that in all of the preceding discussions an underlying strategy is being applied. Namely, wherever there is a system function which is expensive or slow in all its generality, but where software can recognize a frequently occurring degenerate case (or can move the entire function from run time to compile time) that function is moved from hardware to software, resulting in lower cost *and* improved performance.

One interesting example of the application of this overall design strategy concerns managing the cache itself. In the PRISM system the cache line is 32 bytes and the largest unit of a store is four bytes. In such a cache, whose line size is larger than the unit of a store and in which a "store in cache" approach is taken, a store directed at a word which is not in the cache must initiate a fetch of the entire line from the backing store into the cache. This is because, as far as the cache can tell, a load of another word from this line might be requested subsequently. Frequently, however, the store is simply the first store into what, to the program, is newly acquired space. It could be temporary storage on a process stack (e.g., PL/I Automatic) just pushed on procedure call; it could be an area obtained by a Getmain request; or it could be a register store area used by the First Level Interrupt Handler. In all of these cases the hardware does not know that no old values from that line will be needed, while to the software this situation is quite clear.

Accordingly, an instruction has been defined in the PRISM system called SET DATA CACHE LINE, which instructs the cache to establish the requested line in its directory but not to get its old values from the backing store. (Thus, after execution of this instruction, the values in this line will be whatever happened to be in the cache at the time.) If this instruction is executed whenever fresh storage is acquired unnecessary fetches from the backing store will be eliminated. (On the other hand, the execution of the instruction for each new line itself adds CPU cycles. Performance modelling on specific hardware configurations running specific applications will indicate the best tradeoff.)

Similarly when a scratch storage area is no longer needed, executing the instruction INVALIDATE DATA CACHE LINE will turn the "changed" bit off in the cache directory entry corresponding to the named line, thus eliminating an unnecessary storeback. (See copending PCT application serial No. U.S. Pat. No. 82/01830).

The above general discussion of the PRISM features which result in overlapped access to the cache between instructions and data, overlapped backing store access among the caches and I/O, less hardware synchronizing among the caches and I/O, and techniques to improve the cache hit ratios, indicates the overall flavor of the PRISM design objectives.

However, to fully realize the potential objectives of the PRISM system's overall design approach, it has been found advantageous to include certain hardware modifications whereby a number of powerful one-machine cycle executable instructions are available. Five of these architectural features are set forth and described in the present application and the four copending related patent applications:
U.S. patent Ser. No. 509,733
U.S. patent Ser. No. 509,734
U.S. patent Ser. No. 509,836
U.S. patent Ser. No. 566,925

2. RELATED U.S. PATENT APPLICATIONS

The subject application is related to other copending applications having different inventorship entities and owned by the same assignee as the present application. These other applications:

(1) U.S. patent application Ser. No. 509,733, entitled "Mechanism for Implementing One Machine Cycle Executable Trap Instructions in a Primitive Instruction Set Computing System," by M. A. Auslander, J. Cocke, H. Hao, P. W. Markstein and G. Radin.

(2) U.S. patent application Ser. No. 509,734, entitled "Mechanism for Implementing One Machine Cycle Executable Branch-On-Bit-In-Any-Register Instructions in a Primitive Instruction Set Computing System," by M. A. Auslander, H. Hao, M. Hopkins, P. W. Markstein, and G. Radin and W. S. Worley.

(3) U.S. patent application Ser. No. 509,836, entitled "Mechanism for Implementing One Machine Cycle Executable Mask and Rotate Instructions in a Primitive Instruction Set Computing System," by H. Hao, P. W. Markstein and G. Radin.

(4) U.S. patent application Ser. No. 566,925, entitled "Internal Bus Architecture for a Primitive Instruction Set Machine," by J. Cocke, D. Fisk, L. Pereira and G. Radin.

The two following PCT applications filed Dec. 30, 1982 are related to the present application in that they also have particular memory hierarchy including a split cache and to an address translation mechanism respectively.

(1) PCT Ser. No. U.S. 82/01830, entitled "Hierarchical Memory System Including Separate Cache Memories for Storing Data and Instructions," by F. P. Carrubba, J. Cocke, N. H. Kreitzer and G. Radin.

(2) PCT Ser. No. U.S. 82/01829, entitled "Virtual Memory Address Translation Mechanism with Controlled Data Persistence," by A. Chang, J. Cocke, M. F. Mergen and G. Radin.

3. Prior Art

An article entitled "The 801 Minicomputer," by George Radin, published in ACM SIGPLAN NOTICES, Vol. 17, No. 4, April 1982, pages 39–47, includes a general description of an experimental computer whose operational characteristics depend to a large extent on a very fast memory subsystem having separate caches for instruction and data and also having a primitive very basic instruction set providing most commonly used machine operations most of which should be executable in a single machine cycle. The various one cycle executable instructions of the above referenced copending applications and the condition register architecture of the present invention have particular utility in such a machine architecture.

A similar CPU architecture has been described by Patterson and Sequin in "RISC 1: a Reduced Instruction Set VLSI Computer," in the IEEE 8th Annual Symposium on Architecture Conference Proceedings of May 12–14, 1981, at pages 443–449, and in expanded form in IEEE Computer, September 1982 at pages 8–20. The RISC 1: system is stated to be a reduced instruction set machine. No reference is made to any special condition register architecture or hardware for implementing same in this article.

SUMMARY AND OBJECTS OF THE INVENTION

It is a primary object of the present invention to provide an extended condition register for recording the results of initial hardware events.

It is a further object of the invention to provide a plurality of bits to track carries between BCD digit during certain decimal assist operations.

It is a further object to provide a bit which detects any BCD digit carry to assist in checking the validity of certain decimal operations.

It is a further object to provide a summary overflow bit which is set when an overflow occurs as the result of any one of a series of instructions following the 'set overflow' instruction.

The herein disclosed system architects the condition code bits so that they assist significantly in the implementation of multi-cycle functions on a single machine cycle instruction computer.

The present condition code architecture together with the inclusion of some special instructions insures that on the one hand, no complicated and time-consuming circuitry is required in the machine design whereby all permitted instructions are defined and implementable in one machine cycle. On the other hand, special assist indicators (as defined by means of the herein provided condition bits) are included to permit the construction of high-function multi-step instructions where needed, using primitive instruction routines.

BRIEF DESCRIPTION OF THE DRAWINGS

FIG. 2 comprises an organizational drawing for FIGS. 2A and 2B.

FIGS. 2A and 2B comprise a functional block diagram and data flow diagram of a CPU designed to utilize the trap instructions and mechanism of the present invention.

DESCRIPTION OF THE PREFERRED EMBODIMENT

Figure 1:
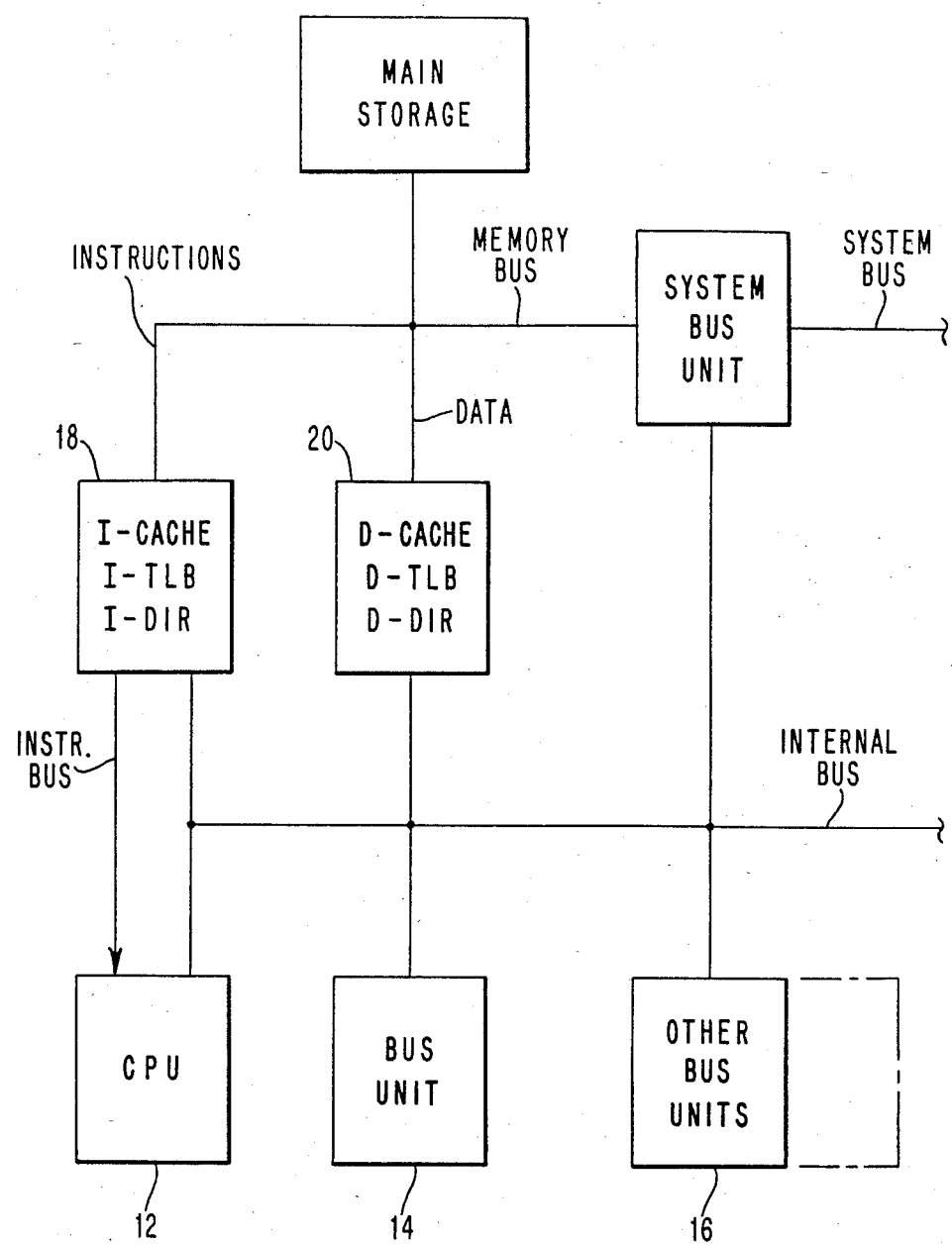
FIG. 1 comprises a high level block diagram of the primary system components including the CPU, main storage, the D and I caches, the system I/O bus and the internal bus with a number of bus units attached thereto.

General Description of Host PRISM System Architecture

The heart of the previously referenced PRISM system is its Central Processing Unit (CPU). In fact, most of the other aspects of the system are designed to make available to the user the fundamental power of this engine. In addition to its CPU, the overall system consists of the main storage, cache facilities, relocate facilities, and system I/O (See FIG. 1). The cache is split into two parts, one for data, the other for instructions. (See previously referenced PCT Application No. US82/01830.)

As stated previously the CPU architecture is a radically simpler alternative to the complex prior art mainframes. The major distinguishing characteristics of the present PRISM system architecture is that its instructions are designed to execute in a single machine cycle by hardware.

That is, every primitive instruction takes exactly one machine cycle, except for accessing storage, which will usually be overlapped. The term primitive as used herein, relates to time rather than simplicity of concept. Thus primitive is closely associated with the concept of a single machine cycle. That is to say the primitive instructions are those which are effectively executable within a single machine cycle although the actual functions may be relatively complex in terms of what actually takes place within the system hardware.

Going further, the term single machine cycle may be defined in a number of ways. Stated in one way a single machines cycle is the period of the basic system clock which continually repeats itself during the operation of the system and during which time basic system operations are performed. Stated in a somewhat different way a single machine cycle is the period of time necessary for the system to use the complete set of system clock pulses once, i.e., all of the pulses included in the basic clock period. Thus within a single machine cycle all of the CPU data flow facility may be used once.

Complex functions are implemented in the system in "micro-code" just as they are in conventional CPUs, except that in the PRISM system this micro-code is just code; that is, the functions are implemented by software subroutines running on the primitive instruction set.

Using the concept of executing complex operations with code resistant in cache, the number of cycles required to do a particular job is at worst no more than on a conventional (low-to-moderately priced) CPU in which the complex instructions have been microprogrammed. But by carefully defining the primitive instructions to be an excellent target machine for the compiler, it is found that far fewer cycles are actually required on the CPU.

The one machine cycle executable 'trap' instruction disclosed in copending U.S. application Ser. No. 509,733 is exemplary of a newly conceived primitive instruction which is intended to save significant amounts of time in memory accessing operations wherein 'range checking' can be accomplished simply (one machine cycle) and effectively in the vast majority of instances.

Thus the PRISM system architecture and its instruction set are the achievement of the following three pervasive strategies. First a fast one-cycle per instruction CPU is defined with an instruction set which was a good target for compilation. Next, an approach to the storage hierarchy, I/O, relocate, and software were developed to overlap these activities with CPU execution, so that it waits minimally.

Finally, an optimizing compiler is developed which produces code which is safe and efficient enough so that the system can be built to assume that all programs have been compiled by this compiler.

In addition to being executable in one machine cycle, the other overriding theme of the instructions is their regularity. This has helped to make the hardware implementation easier. For instance:

All operands must be aligned on boundaries consistent with their size (i.e., halfwords on halfword boundaries, words on word boundaries). All instructions are fullwords on fullword boundaries.

Register name fields are made five bits long so that 32 register implementations are possible when the technology makes this choice desirable. (This aspect of PRISM system architecture makes it feasible to use the system to emulate other architectures which have 16 GPRs, since 16 PRISM registers are still available for emulator use. A major problem with using the primitive subset of S/370 instructions for emulating complex instructions is the just described register name field restriction.)

Four byte instructions also allow the target register of every instruction to be named explicitly so that the input operands need not be destroyed. This is generally called a "three address" format.

The PRISM system is a true 32-bit architecture, not a 16 bit architecture with extended registers. Addresses are 32-bits long; arithmetic is 32 bit two's complement; logical and shift instructions deal with 32-bit words (and can shift distances up to 31).

The major components of the PRISM CPU shown in the data flow diagram of FIG. 2 are a two-input ALU, a five-port (3-output, 2-input) general purpose register file (32 registers of 32-bits each), and condition logic and the condition register. The condition register (CR) is a 32-bit register which reflects the effect of certain operations, and provides a mechanism for testing (and branching).

Tables 1(a) and 1(b) comprise a complete listing of the 32-bits in the condition register as well as their function in the overall CPU architecture. The novel aspects of the present expanded condition register, the underlying condition register architecture, and a number of applications of this architecture will be set forth more fully subsequently.

TABLE 1(a)

Condition Register Bit Designation

| Bit | Name | Description |
| --- | --- | --- |
| 0 | SO | Summary Overflow |
| 1 | OV | Overflow |
| 2 | LT | Compares Less Than, Negative Value |
| 3 | GT | Compares Greater Than, Positive Value |
| 4 | EQ | Compares Equal, Zero Value |
| 5 | LL | Logical Less Than |
| 6 | LG | Logical Greater Than |
| 7 | CA | Carry from bit 0 |
| 8 | C4 | Carry from bit 4 |
| 9 | C8 | Carry from bit 8 |
| 10 | C12 | Carry from bit 12 |
| 11 | C16 | Carry from bit 16 |
| 12 | C20 | Carry from bit 20 |
| 13 | C24 | Carry from bit 24 |
| 14 | C28 | Carry from bit 28 |
| 15 | CD | Carry from any 4-bit nibble |
| 16 | PZ | Permanent Zero |
| 17-25 | | (Reserved for future use) |
| 26 | EC0 | External Condition 0 |
| 27 | EC1 | External Condition 1 |
| 28 | EC2 | External Condition 2 |
| 29 | EC3 | External Condition 3 |
| 30 | BB | Bus Busy (for Conditional Bus Operations) |
| 31 | HO | Halfword Overflow (overflow from lower 16 bits) |

TABLE 1(b)

Functional Description of the Bits in the Condition Register (Note: Bits not set by an instruction retain their old values.)

Bit 0 (SO) is the Summary-Overflow bit. Whenever an instruction sets the overflow bit to indicate overflow, it sets the SO bit to one, otherwise the SO bit is unchanged. (The use of overflow as a special indicator in divide step does not affect Summary-Overflow.)

Bit 1 (OV), the Overflow bit, is set to indicate that an overflow has occurred during an instruction operation. It is set to one on add and subtract instructions if the carry out of bit zero is not equal to the carry out of bit one. Otherwise it is set to zero. It also functions as a special purpose indicator for the Divide Step instructions. It is not altered by the compare instructions.

Bits 2-6 are set to indicate the computation result of the executed instruction.

Bit 5 (LL), the Logical-Less-Than bit, and

Bit 6 (LG), the Logical Greater Than bit, are set considering the two operands as 32-bit unsigned integers. Bit 2 (LT), the Less-Than bit, Bit 3 (GT), the Greater-Than bit, and Bit 4 (EQ), the Equal bit, are set considering the two operands as 32-bit signed integers in two's complement representation.

Bits 2-6 are also set by the compare and logical instructions.

Bit 7 (CA), the Carry bit, is set to indicate a carry from bit 0 of the computed result. On add and subtract instructions it is set to one if the operation generates a carry out of bit 0. If there is no carry out it is set to zero. It also functions as a special-purpose indicator for the Divide and Multiply instructions. It is not altered by the compare instructions.

Bits 7-14 indicate carry outs of each nibble in the ALU. Bit 8 (C4) is set to 1 if there is a carry out of bit 4. It is set to 0 if there is no carry out.

Bits 9-14 (C8-C28) are set similarly. These carries are provided to assist in performing decimal arithmetic.

Bit 15 (CD) is set to 1 if there is a carry out of any 4-bit nibble. Otherwise it is set to 0.

Programming note: CD can be used to verify that all of the decimal digits in a number are valid.

Bit 16 (PZ) is the permanent-zero bit. It is always zero and it cannot be reset to one. Its presence provides for an unconditional branch by use of the Branch False instruction, where the permanent zero bit is specified.

Bits 17-25 are reserved bits. They are implemented in the disclosed architecture but are not modified by any conditions in the CPU. It will accordingly be apparent that they may readily be hardwired in a next generation CPU to keep track of desired system operations. These bits of the condition register can be arbitrarily set by the Load Condition Register instruction. Subsequent fetches or tests will reflect those values.

Bits 26-29 (EC0 through EC3), External Condition Bits. These bits are set to the values of the corresponding CPU inputs EXT-COND-0 through EXT-COND-3 when the EXT-COND-VALID is active.

Bit 30 (BB), the Bus Busy bit, is set to 1 if a CBO, CBOU, or CBOI instruction could not be executed by a bus unit because it was busy, otherwise it is set to zero for those instructions. It is unchanged by other instructions.

Bit 31 (HO), the Half Word Overflow bit, is set to indicate that an overflow on the lower 16 bits has occurred during an instruction operation. It is set to one on add and subtract instructions if the carry out of bit 16 is not equal to the carry out of bit 15. Otherwise it is set to zero. It is not altered by the compare instruction.

The MQ register is a 32-bit register whose primary use is to provide a register extension to accommodate the product for the Multiply Step instruction and the dividend for the Divide Step instruction. It is also used as an operand storage location for long shift and rotate and store instructions.

The Instruction Register is a 32-bit register which is quite conventional in nature. The following instruction formats illustrated in Table 2(a) are utilized in the system.

The instruction address register is conventional in nature and points to the location in memory where a desired instruction is resident.

The Mask and Rotate (M&R) Logic block contains the logic circuitry necessary to perform the M&R instructions specifically disclosed and described in previously referenced concurrently filed application Ser. No. 509,836.

The Condition Logic and Condition Register is conventional to the extent that the setting of the various bits therein is required as the result of specified conditions which do or do not occur as a consequence of various system operations. Details of the architectural concepts involved in the chosing of the functions to be monitored and retrieved in the condition register and their subsequent application will be set forth subsequently.

Both the Data and Instruction Cache Interfaces provide paths for providing instruction addresses and data between the two caches and the CPU. Details of the operation of these caches are set forth in previously referenced copending PCT Application Ser. No. 82/01830.

All instructions are four bytes long and are located on fullword boundaries.

Bits 0-5 always specify the op code. For some instructions, bits 21-31 specify extended op codes.

The remaining bits contain one or more of the following fields, in the indicated bit positions:

TABLE 2(a)

Instruction Formats

D-form, UL-form

```
0      6   11   16           31
| OPCD | RT | RA |     D      |
       | RS |
       | BI |
```

M-form

```
0      6   11   16   21       31
| OPCD | RT | RA | RB | MASK  |
                | SH |
```

X-form

```
0      6   11   16   21       31
| OPCD | RT | RA | RB |  EO   |
       | RS |    | SH |
       | BI |
```

Table 2(b) contains a definition of the various instruction fields used in the instruction formats illustrated in Table 2(a).

TABLE 2(b)

OPCD (0-5)
The basic op code field of the instruction.
RT (6-10)
Name of the register used as the "target" to receive the result of an instruction.
RS (6-10)

Name of the register used as a source for an instruction.

RA (11–15)

Name of the register used as the first operand or as the target for rotate instructions.

RB (16–20)

Name of the register used as the second operand.

BI (6–10)

Immediate field specifying a register bit or a trap mask.

SH (16–20)

Immediate field specifying a shift amount.

D (16–31)

Immediate field specifying a 16-bit signed integer in two's complement notation. When this field is used with other fields that are 32-bits in length the D field is always sign extended.

MASK (21–31)

Immediate field specifying a 32-bit string, consisting either of a substring of ones surrounded by zeros or a substring of zeros surrounded by ones. The encoding is as follows:

Bit 21

0=ones surrounded by zeros
1=zeros surrounded by ones

Bits 22–26

Index to leftmost bit of substring

Bits 27–31

Index to rightmost bit of substring

A mask field of '10000011111' generates an all zero mask. A mask field of '00000011111' generates an all one mask. The result of specifying an invalid mask (i.e. first index greater than last index) is undefined.

EO (21–31)

The extended op code.

The four previously referenced copending applications filed concurrently with the present application all relate to specific hardware enhancements which render such a PRISM system more efficient.

Description of the Present Condition Register Architecture

A major distinguishing characteristic of the primitive instruction set computer architecture set forth in the previously referenced G. Radin article is that its instructions should be constrained to execute in a single, straight-forward, rather primitive machine cycle. The implementation of these primitive instructions is generally hardwired. The conventional complex, high-function instructions, such as floating point arithmetic, fixed point multiply, decimal operations and storage to storage moves are implemented as software procedures or macros rather than in micro code. The resulting advantages of this are described below.

First, the CPU is interruptible at "microcode" boundaries, hence more responsive Architectures with complex instructions either restrict interrupts to instruction boundaries, or (as in, for instance, the Move Characters Long instruction on IBM S/370 Machines) define specific interruptible points. If the instruction must be atomic, the implementation must ensure that it can successfully complete before any observable state is saved. Thus, in the S/370 Move Character instruction, before starting the move, all pages are pretouched (and locked in an MP system) to guard against a page fault interrupt occurring after the move has begun. If interruptible points are architected, the state must be such that the instruction is restartable.

The second advantage of programming these functions is that an optimizing compiler can often separate their components, moving some parts out of a loop, commoning others, etc.

Thirdly, it is often possible for parts of a complex instruction to be computed at compile time. Consider, for instance, a multiply instruction. If one of the operands is a constant, known at compile time, the compiler can often produce more efficient "shift/add" sequences than the general multiply microcode subroutine.

To assist the construction of complex functions that cannot be completed in a single machine cycle, the condition code bits are architected and several special partial arithmetic instructions are defined to provide the significant hardware assist for optimum machine design.

Definitions of Condition Register Bits and Some Special Instructions

The condition register (CR) is a 32-bit register which reflects the effect of certain operations, and provides a mechanism for testing (and branching).

The preceding detailed description of the bits in the condition register and their functions as set forth in tables 1(a) and 1(b) should be referred to to facilitate understanding the following description. All reserved bits of the condition register can be arbitrarily set by the Load Condition Register instruction. Any reserved bit can be tested by conditional branch or trap instructions. The reserved bits may not be present in all implementations. Thus, although values may be loaded into these bits, subsequent fetches or tests may not reflect those values. It is the intention of the overall architecture that bits 17–23 be used for future extensions which are universal. Model-dependent uses of the condition register could be placed in bits 24–31.

Format and Definition of Typical Arithmetic Instructions which Utilize the Present Expanded Condition Register These instructions are provided to allow construction of functions that cannot be completed in a single processor cycle, but where hardware assist can be significant (i.e., multiply and divide).

Divide Setup
DVSET RS,RA,RB

| 0 | 6 | 11 | 16 | 21 | 31 |
|---|---|----|----|----|----|
| 63 | RS | RA | RB | 62 | |

The contents of RS are loaded into the MQ. The carry bit is set to reflect the relationship of the signs of RA and RB so that a subsequent Divide Step instruction on those values will operate correctly.

Condition Codes:

CA=1 if the signs of RA and RB agree, 0 if they disagree.

All other condition bits are unchanged.

Divide Step, X-form
DVS RT,RA,RB

| 0 | 6 | 11 | 16 | 21 | 31 |
|---|---|----|----|----|----|
| 63 | RT | RA | RB | 13 | |

The contents of register RA is subtracted from (RB || (bit 0 of MQ)) if CA is one, or the contents of register RA is added to (RB || (bit 0 of MQ)) if CA is zero. The 32 low order bits of the sum are loaded into register RT. The MQ is shifted left one position, and bit 31 of the MQ is set to 1 if the sign of the result equals the sign of register RA; else it is set to 0.

Condition Codes:

CA=1 if bit 0 of RA is equal to the sign of the result, else CA=0

OV=1 if bit 0 of RB is equal to the
sign of the result, else OV=0

All other condition bits are unchanged.

An example of a typical (divide) operation is set forth in appendix (1) following the description of FIG. 2. Referring to this example will materially aid in an understanding of the use of the above single cycle primitive instructions together with the expanded condition register to effect efficient multi-step (divide) operations in a PRISM type of architecture.

Multiply First Step
MFS    RT,RA

```
0    6   11   16   21   31
| 63 | RT | RA | //// | 14 |
```

The 34 bit incomplete product of RA and bits 30-31 of the MQ is formed in accordance with the following table:

| MQ BIT 30 | MQ BIT 31 | ALGEBRAIC SUM |
|---|---|---|
| 0 | 0 | 0+0 |
| 0 | 1 | 0+RA |
| 1 | 0 | 0−2*RA |
| 1 | 1 | 0−RA |

RA is sign extended before the 34 bit addition. The high order 32 bits of the sum are placed in RT. The MQ is shifted right two positions, and the two low order bits of the sum then replace bits 0-1 of the MQ.

Condition Codes:

CA is set to the value of bit 30 of the MQ (before shift).

All other condition bits are unchanged.

Multiply Step, X-form
MPS    RT,RA,RB

```
0    6   11   16   21   31
| 63 | RT | RA | RB | 15 |
```

The 34 bit incomplete product of RA and bits 30-31 of the MQ is added to RB in accordance with the following table:

| MQ BIT 30 | MQ BIT 31 | CA BIT | ALGEBRAIC SUM |
|---|---|---|---|
| 0 | 0 | 0 | RB+0 |
| 0 | 1 | 0 | RB+RA |
| 1 | 0 | 0 | RB−2*RA |
| 1 | 1 | 0 | RB−RA |
| 0 | 0 | 1 | RB+RA |
| 0 | 1 | 1 | RB+2*RA |
| 1 | 0 | 1 | RB−RA |
| 1 | 1 | 1 | RB+0 |

RA and RB are sign extended before the 34 bit addition. The high order 32 bits of the sum are placed in RT. The MQ is shifted right two positions, and the two low order bits of the sum then replace bits 0-1 of the MQ.

Condition Codes:

CA is set to the value of bit 30 of the MQ (before shift).

All other condition bits are unchanged.

(c) DECIMAL INSTRUCTIONS

The instructions in this section are used in the execution of decimal arithmetic. They perform binary arithmetic using operands created by inspecting the CR bits CA, C4–C28, as described below.

These CR bits are defined as follows:

CD indicates if there was a carry out of any decimal digit. C4–C28 indicates presence of a carry out of the associated bit (4,8,12,16,20,24 or 28). CA indicates a carry out of bit 0.

Add Decimal Sixes, X-form
ADS    RT,RB

```
0    6   11   16   21   31
| 63 | RT | //// | RB | 04 |
```

A word composed of 6's in every decimal digit is added to the contents of register RB. The result is loaded into register RT.

Condition Codes:

Set: LT, EQ, GT, LG, OV, CA, CD, C4–C28, SO

Set to 0: LL

Subtract From with Decimal Mask, X-form
SFDM    RT,RB

```
0    6   11   16   21   31
| 63 | RT | //// | RB | 05 |
```

A word composed of 0's in every decimal digit from which there was a decimal carry (as indicated by the condition register) and 6's in every decimal digit from which there was no carry is used as the first operand. The first operand is subtracted from register RB and the result is loaded into register RT.

Condition Codes:

Set: None

THE DECIMAL ADDITION IMPLEMENTATION

Let RA and RB contain two unsigned 8 digit decimal integers. The following routine produces their sum in RC:

| ADS  | RC,RA |
| A    | RC,RB,RC |
| SFDM | RC,RC |

The first instruction adds decimal 6's to all integers in RA and puts the result into RC. Thus, the digits 0-9 are represented by (become) 6-15 respectively. The second instruction adds the quantities in RB to the adjusted quantity in RC. Because of the shifted representation originally present in RC, if no carry should have occurred out of a specific decimal position, that position will have a value 6 higher than its decimal value. If a carry should have occurred in decimal, it will have occurred with the representation that existed, and the resultant digit will be correct in decimal. This is because if $x+y=10+c$ in decimal, then $x+y+6=10+6+c$, and in hexadecimal notation $10+6$ results in a carry, with a net result of c left in the position in question. Thus, from those decimal positions *which did not generate a carry*, six must be subtracted to produce the required decimal result. This is precisely what the last instruction (SFDM) accomplishes. CA (set by the A instruction) indicates whether or not the sum fits into one register (i.e., 8 digits).

Figure 3:
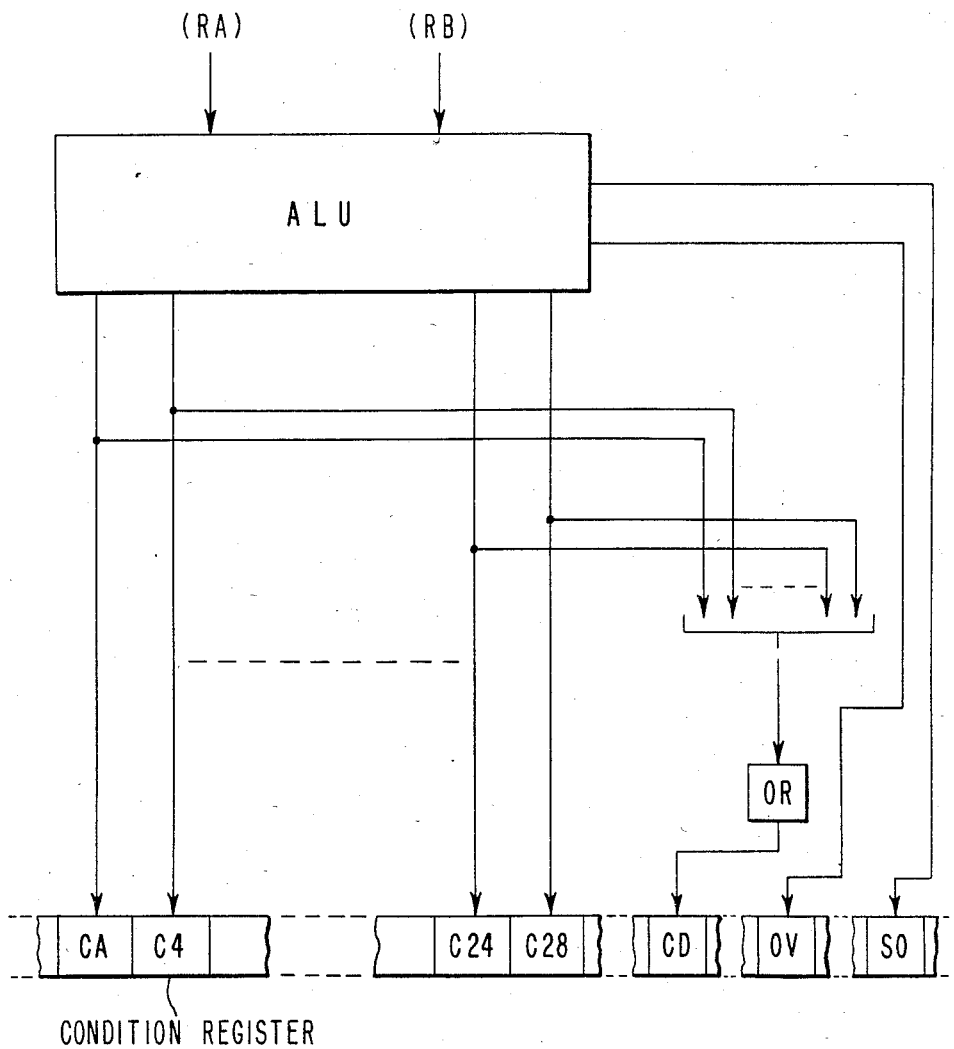
FIG. 3 comprises a diagrammatic illustration of the expanded condition register of the present invention illustrating the herein described condition register architecture.

An example of two (decimal assist) operations is set forth in appendix 2 following the description of FIG. 3. Referring to this example will materially aid in an understanding of the use of the above single cycle primitive instructions together with the expanded condition register to effect efficient multistep (decimal) operations in a PRISM type of architecture.

Uses and Advantages of the Present Condition Register Architecture

The herein disclosed extended condition register architecture as implemented in the PRISM system yields advantages in several areas of programming. Some of these areas are: interpretation of arithmetic results as signed or unsigned quantities, construction of multiple-precision arithmetic routines, construction of full multiplication and division operations from primitive multiply and divide step instructions, decimal arithmetic, keeping track of arithmetic overflow over long stretches of code, and exploitation of common comparison results by an optimizing compiler.

The addition of two numbers, whether signed or unsigned, in a two's complement machine, involves precisely the same circuitry to perform the actual addition. Only the interpretation of the final result is different. The PRISM condition register provides bits to characterize the result in either interpretation: overflow, less-than, or greater-than for signed interpretation, and carry, logically-less-than, or logically-greater-than for unsigned interpretation. Thus, it is not necessary to provide different operation codes to perform signed an unsigned arithmetic.

The carry bit of the condition register is also useful in the construction of multiple precision arithmetic routines. The ADD EXTENDED and SUBTRACT EXTENDED instructions in PRISM are designed to interrogate the CARRY bit (CA) of the condition register, in order to propagate carry effects from low order results to high order results. For PRISM, multiplication and division are multiple instruction operations. In multiplication, the CARRY bit (CA) represents the sign of the partial multiplier used in the most recently executed MULTIPLY STEP instruction. Each multiply step instruction interrogates this bit in order to determine whether the previous leftmost bit was interpreted as a sign, and the MULTIPLY STEP instruction is designed to compensate for this automatically. In similar fashion, one can construct multiple precision multiply routines by using multiple precision multipliers. After all bits in the MQ have been used as multiplier bits, the partial product is extracted from the MQ, and the next 32 multiplier bits inserted; the CARRY bit of the condition register will be set to allow the multiplication to continue without any additional concern for signs.

In programming a division routine, the OVERFLOW bit of the condition register after the first DIVIDE STEP instruction is executed indicates that the quotient will not fit into a single register. The carry bit is used after the last DIVIDE STEP instruction to determine the appropriate remainder.

Each add or subtract instruction sets condition register bits to indicate carries out of each four-bit subfield of the adder. This information can be used in two ways. First, for short precision arithmetic, if the field length is a multiple of four, these additional carry bits in the condition register indicate when a result is too large to fit in a subfield. The most important use of these bits, however, is in conjunction with the decimal arithmetic instructions, which enables PRISM to perform 8 digit addition (and subtraction) in only three (and two) instructions.

The SUMMARY OVERFLOW bit of the PRISM system enables a programmer to write a routine which can determine whether arithmetic overflow had ever occurred during that routine, without testing explicitly after every instruction which could have caused overflow. This greatly simplifies code, eliminates the possible oversight of overflow-producing instructions, and speeds up programs where detection of overflow is critical. The code sketch below shows how such a routine can be structured, with just a short prologue to reset the summary overflow bit, and a one instruction test at the end to determine if any overflow had occurred.

| LFCR | X | copy condition register into register x |
|------|---|---|
| NUI | X,X, '7FFF' | force high order bit (summary overflow) to zero |
| LCR | X | copy word back to condition register |
| ... | | |
| ... | | (body of routine) |
| ... | | |
| BT | 0,SO,FAIL | conditional branch if summary overflow is on, i.e., overflow occurred somewhere in the body of the routine. |

Finally, the ease with which the condition register can be saved leads to optimization opportunities. For example, code such as:

| if A < B then ... ; | /*what to do if A < B */ |
|---|---|
| else if A = B then ... ; | /*what to do if A = B */ |
| else ... ; | /*what to do if A > B */ | requires only one comparison of A against B. The first if statement tests the less-than bit of the condition register, and the second if statement tests the equal bit of the condition register, so long as no instruction between the two branch instructions alters the condition register. (The second comparison need not be done, nor do the operands, A and B, have to be preserved until the second if.) The compiler, however, is in a position to determine if the condition code could be altered before the second if statement, and if this were the case, the condition register could be copied with one instruction into a general purpose register. Then, the second if statement could examine the corresponding bit in the general register with a branch-on-any-bit-in-any-register instruction (see copending application Ser. No. 509,734.

Key to all these applications is the fact that the state of the condition register can easily be saved and restored, each such operation taking just one instruction. Thus interruption of a PRISM CPU during a macro operation (such as multiply) which makes use of the condition register places no restrictions on the way the macro operation is coded; it is entirely reasonable to expect the condition register to be preserved over unexpected context switches.

Description of the Hardware Implementation of the Present Condition Register Architecture Since the present invention resides primarily in the novel architectural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

In general, FIGS. 1 and 2 (2A & 2B) comprise a broad functional block diagram and a CPU data flow diagram respectively of a typical PRISM architected system. FIG. 3 illustrates diagrammatically the connections within the CPU of the present expanded condition register to the ALU to provide the data required for setting the SO, CA, C4, C8, C12, C16, C20, C24, C28 and CD bits of the condition register. Referring to FIG. 1 an overall organizational block diagram of a typical PRISM system architecture is shown. The CPU 12 is depicted as a separate unit, however, it will be understood that the internal bus 10 is actually a composite member of the basic CPU architecture. Specific units shown directly attached to the internal bus 10 are the floating point unit 14 and a block designated other bus units 16 which, as will be readily understood, may comprise a plurality of different units separately attached to the bus 10. The instruction cache 18 and data cache 20 are also illustrated as connected to the internal bus and thus operable under various internal bus operation instruction formats (described previously). A system bus unit 22 is also shown connected to the internal bus which would primarily perform the function of system I/O operations to and from main storage as will be understood by those skilled in the art. No specific instructions for controlling the system bus unit are described herein, however, operation instructions to control such a system bus unit are well known and would be obvious to those skilled in the art.

FIGS. 2A and 2B form a composite functional block and data flow diagram for the PRISM CPU. These two figures are organized as shown in the organizational diagram of FIG. 2.

The data flow within the basic PRISM organization is clearly shown in FIGS. 2A and 2B. The basic CPU includes a five port general purpose registers block 30 containing thirty two individual registers. The two inputs to the register block RT and RA as well as the three outputs RA, RB, RS indicate the particular instruction designated operands set forth in the previous description of the instruction formats. As will be apparent to those skilled in the art, the (address of the) particular general purpose register in which the various operands are to be stored or from which they are to be fetched would be specified in the various fields of the instruction register.

The organization of the instruction register 32 is straightforward. It should be noted that this is a 32-bit register with the various delineated fields within the register clearly shown in the drawing (designated bits) as well as the mnemonic representations of the various fields as used in the previously described instruction formats. The designated BI, SH and M beneath the primary instruction register box 32 indicates the mnemonic representation given to these fields in certain of the instructions. However it should be understood that these are shown outside of the instruction box for convenience of reference only.

The instruction address register (IAR) 34 is also conventional in nature and would be initially loaded at the beginning of a program and suitably incremented or reloaded by the program subsequently as required. Block 36 labeled (IAR +4) contains the next instruction address.

The data flow from the instruction register 32 and the general purpose registers 30 is clearly shown in the figures thus, for conventional arithmetic operations the two multiplexers 38 and 40 may receive as input operands various fields from the instruction address register 34, instruction register 32 and the specified operands RA, RB from the general purpose registers 30. Thus the ALU 42 performs two operand operations and places the result in output buffer register 44. As will be apparent the output from the ALU may also go directly to the instruction address register 34, the condition logic and condition register block 50, the branch and trap testing logic 52 and the address gate 54 which supplies addresses to the system memory when required.

The output of the buffer register 44 is able to return data to the general purpose registers 30 via the multiplexers 46 and 48 depending upon whether the field RA or RT is specified by the instruction.

The mask and rotate logic block 56 performs a one-machine cycle executable Mask and Rotate operation set forth in more detail in copending application Ser. No. 509,836, referenced previously. The details of the condition logic and condition register block 50 are the subject matter of the present application.

Block 52 entitled branch and trap testing comprises the circuitry necessary to perform the trap testing function and produce a trap interrupt if necessary and also to perform "branch-on-bit" testing which latter is the subject matter of previously referenced copending applications Ser. No. 509,733, and Ser. No., 509,734, respectively.

Gates 56 and 58 serve to gate data to and from the system memory as required for certain specified operations. These two gates and buses comprise the Data Cache Interface.

The register MQ shown in the mask and rotate logic block 56 is an extension register for storing the overflow contents from a number of arithmetic operations such as multiply and divide. It is functionally located in this block for purposes of the present embodiment as it is utilized during the certain mask and rotate instructions which are set forth and claimed in copending application Ser. No. 509,836.

The implementation of the defined condition code bits are quite straightforward to implement in hardware as shown in FIG. 3 diagrammatically. Most bits are directly generated from the ALU output. The following are some examples. Condition code bits CA, C4, C8, C12, C16, C20, C24 and C28 are obtained by making the internal ALU nibble carry bits available externally and latched up in the CR. Thus the carries from bits 0, 4, 8, 12, 16, 20, 24 and 28 are physically latched into the condition register.

The CD bit of the condition register is obtained by ORing of all the inputs to CA, C4, C8 through C28.

The Summary Overflow (SO) bit is generated by using the data input to the OV latch as the set input for the SO latch. Thus, whenever an instruction sets the overflow bit (OV) to indicate overflow, it sets the summary-overflow bit (SO) to "1".

A number of things will be seen from the preceding detailed description of the herein disclosed expanded condition register architecture and the description of its use in the CPU. It makes available to both systems and application programmers data concerning the state of the machine after completion of certain primitive operations whereby complex functions such as the disclosed multiply-step, divide-step and decimal assist operations are significantly speeded up. It is, of course, to be understood that using the above teachings other different special purpose complex functions may also be significantly enhanced utilizing the data available in the condition register.

While the invention has been set forth and described with respect to the herein disclosed preferred embodiment thereof, it will be readily appreciated by those skilled in the art, that many changes may be made in the form and detail of both the instructions and in certain hardware details which might alter certain internal operating sequences without departing from the spirit and scope of the present invention as set forth in the appended claims.

APPENDIX 1

Divide Step Usage

The following example computes the quotient and remainder of 28 (1 C in hexadecimal) divided by 3 (3 in hexadecimal). Register 5 is set to zero because the remainder from any previous operations is zero. The quotient is provided in MQ and the remainder is in Register 5.

It should be noted, that if the dividend were larger than 32 bits the MQ could be saved and loaded with the additional bits and the division could continue developing bits.

| INSTRUC- | COND. REG. | | | | |
|---|---|---|---|---|---|
| TIONS | OV | CA | REG 4 | REG 5 | MQ |
| S     5,5,5 | 0 | 1 | 00000003 | 00000000 | 0000001C |
| DVS 5,4,5 | 1 | 0 | 00000003 | FFFFFFFD | 00000038 |
| DVS 5,4,5 | 1 | 0 | 00000003 | FFFFFFFD | 00000070 |
| DVS 5,4,5 | 1 | 0 | 00000003 | FFFFFFFD | 000000E0 |
| DVS 5,4,5 | 1 | 0 | 00000003 | FFFFFFFD | 000001C0 |
| DVS 5,4,5 | 1 | 0 | 00000003 | FFFFFFFD | 00000380 |
| DVS 5,4,5 | 1 | 0 | 00000003 | FFFFFFFD | 00000700 |
| DVS 5,4,5 | 1 | 0 | 00000003 | FFFFFFFD | 00000E00 |
| DVS 5,4,5 | 1 | 0 | 00000003 | FFFFFFFD | 00001C00 |
| DVS 5,4,5 | 1 | 0 | 00000003 | FFFFFFFD | 00003800 |
| DVS 5,4,5 | 1 | 0 | 00000003 | FFFFFFFD | 00007000 |
| DVS 5,4,5 | 1 | 0 | 00000003 | FFFFFFFD | 0000E000 |

-continued

| INSTRUC- | COND. REG. | | | | |
|---|---|---|---|---|---|
| TIONS | OV | CA | REG 4 | REG 5 | MQ |
| DVS 5,4,5 | 1 | 0 | 00000003 | FFFFFFFD | 0001C000 |
| DVS 5,4,5 | 1 | 0 | 00000003 | FFFFFFFD | 00038000 |
| DVS 5,4,5 | 1 | 0 | 00000003 | FFFFFFFD | 00070000 |
| DVS 5,4,5 | 1 | 0 | 00000003 | FFFFFFFD | 00E00000 |
| DVS 5,4,5 | 1 | 0 | 00000003 | FFFFFFFD | 001C0000 |
| DVS 5,4,5 | 1 | 0 | 00000003 | FFFFFFFD | 00380000 |
| DVS 5,4,5 | 1 | 0 | 00000003 | FFFFFFFD | 00700000 |
| DVS 5,4,5 | 1 | 0 | 00000003 | FFFFFFFD | 00E00000 |
| DVS 5,4,5 | 1 | 0 | 00000003 | FFFFFFFD | 01C00000 |
| DVS 5,4,5 | 1 | 0 | 00000003 | FFFFFFFD | 03800000 |
| DVS 5,4,5 | 1 | 0 | 00000003 | FFFFFFFD | 07000000 |
| DVS 5,4,5 | 1 | 0 | 00000003 | FFFFFFFD | 0E000000 |
| DVS 5,4,5 | 1 | 0 | 00000003 | FFFFFFFD | 1C000000 |
| DVS 5,4,5 | 1 | 0 | 00000003 | FFFFFFFD | 38000000 |
| DVS 5,4,5 | 1 | 0 | 00000003 | FFFFFFFD | 70000000 |
| DVS 5,4,5 | 1 | 0 | 00000003 | FFFFFFFD | E0000000 |
| DVS 5,4,5 | 1 | 0 | 00000003 | FFFFFFFE | C0000000 |
| DVS 5,4,5 | 0 | 1 | 00000003 | 00000000 | 80000001 |
| DVS 5,4,5 | 1 | 0 | 00000003 | FFFFFFFE | 00000002 |
| DVS 5,4,5 | 1 | 0 | 00000003 | FFFFFFFF | 00000004 |
| DVS 5,4,5 | 0 | 1 | 00000003 | 00000001 | 00000009 |

APPENDIX 2

Decimal Add

Addition and subtraction of decimal coded numbers is easily performed using the binary add and subtract instructions with the Subtract From With Decimal Mask (SFDM) instruction.

The following algorithm is used. Add X'66666666' to one of the operands. Add the other operand into the first result. From the second result subtract a properly masked X'66666666' with the SFDM instruction.

The following example adds 34 and 27 stored in registers 4 and 5 respectively. Assume register 6 contains X'66666666'.

| Instruction | Reg 3 | Carries | Action |
|---|---|---|---|
| A       3,4,6 | 6666669A | 00000000 | 34 + 66 = 9A |
| A       3,3,5 | 666666C1 | 00000001 | 9A + 27 = C1 |
| SFDM 3,6,3 | 00000061 | 00000000 | B1 − 60 = 61 |

Decimal Subtract

The following example subtracts 27 from 34 stored in registers 4 and 5 respectively. Assume register 6 contains X'66666666'.

| Instruction | Reg 3 | Carries | Action |
|---|---|---|---|
| SF     3,4,5 | 0000000D | 11111110 | 34 − 27 = 0D |
| SFDM 3,6,3 | 00000007 | 00000000 | 0D − 06 = 07 |

Having thus described our invention, what we claim as new, and desire to secure by Letters Patent is:

1. In a digital electronic computing system having a single machine cycle executable instruction set and including a memory hierarchy comprising a main memory and a highspeed cache, a Central Processing Unit (CPU) and a bus network interconnecting said memory hierarchy and said CPU, said CPU including an Arithmetic and Logic Unit (ALU) for performing arithmetic and logical operations on data supplied thereto including an N-bit adder, an instruction execution unit operable in cooperation with an instruction register and a plurality of simultaneously accessible general purpose registers to supply operands to said ALU and to control said ALU for processing primitive instructions to be performed by said system, and condition code generating means for generating a plurality of specified condition bits in accordance with the output of the ALU and the instruction unit to store the state of certain operations occurring during a current machine cycle, the improvement which comprises a system architecture in which said condition code generating means includes:

an expanded condition register, containing N/4 carry bit storage locations where N equals the number of bits in the adder, means for performing decimal add/subtract operations in the system utilizing said expanded condition register including, means for converting one of two decimal operands coded in BCD format to a hexadecimal representation by adding the decimal value 6 to each decimal digit of the operand before performing a decimal ADD/SUBTRACT operation, means for setting a condition register bit (CA, C4, C8, . . . CN) inthe event of a 'carry' out of any four bit hexademical subfield of the adder for bits 0, 4, 8, . . . N, where N is a multiple of four, for decimal ADD/SUBTRACT operations and means for converting the hexadecimal result back into a BCD representation.

2. A condition code generating means as set forth in claim 1 wherein said means for converting the hexadecimal result back into a BCD format include means for subtracting the decimal value 6 from those BCD digits where a corresponding bit in the conditions register (CA, C4, C8, . . . CN) was set to a "1" by the preceding ADD/SUBTRACT operation.

3. A condition code generating means as set forth in claim 1 including means for setting an additional condition register bit (CD) in the event of a 'carry' out from any of said adder stages 0,4,8, . . . N.

4. A condition code generating means as set forth in claim 3 further including means for setting a summary overflow bit in said expanded condition register when an overflow from the adder stage bit '0' is not equal to the overflow from bit '1', as the result of any one of a plurality of specified successive instructions following resetting of the summary overflow bit to '0'.

5. A condition code generating means as set forth in claim 4 including means for transferring the contents of the entire expanded condition register into one of said general purpose registers, means for selectively reconfiguring the data in said general purpose register and, means for subsequently returning the data in said general purpose register to said condition register when required.

6. A condition code generating means as set forth in claim 4 said instruction unit and condition code generating means including means for implementing a multiply-step instruction between a multiplier and a multiplicand wherein a partial product of the multiplicand and a 2-bit partial multiplier is formed by a shift and add operation which comprises means for accessing the CA bit from the condition register which was set by the preceding multiply-step operation and using said accessed bit as a sign bit for the partial multiplier for a current operation, and means for storing the sign of the current partial multiplier in codnition register bit CA in case another multiply-step follows.

7. In a digital electronic computing system including memory means for storing instructions and data and a central processing unit (CPU) for executing said instructions wherein said central processing unit includes at least an instruction unit for accessing and decoding instructions and an arithmetic logic unit (ALU) further including an N-bit adder for performing the operations specified by said instructions, said CPU also including an expanded condition register which contains bits set in accordance with the results of specified ALU operations, the improvement which comprises a method for facilitating the execution of single machine cycle executable primitive instructions utilizing said expanded condition register, said method including saving in said expanded condition register bits (CA, C4, C8, . . . CN) upon the occurrence of a 'carry' out of any four bit subfield of the N-bit adder for bits 0,4,8, . . . N where N is a multiple of 4, setting an additional condition register bit (CD) in the event of a 'carry' out from any of said adder stages 0,4,8, . . . N, setting a summary overflow (SO) bit wherever the result from any of a specified set of subsequent instructions could have set an overflow bit (OV) in the expanded condition register, and accessing the expanded condition register during the initial phases of certain of said single machine cycle executable instructions for controlling data flow within the CPU in accordance with specified instructions contained in said instruction register.

8. A method utilizing an expanded condition register as set forth in claim 7 including utilizing said condition register bits CA,C4, 8, . . . CN in decimal addition operations where each four bit subgroup of an addend and augend supplied to the ALU unit represents a binary coded decimal digit, utilizing a 'carry' indication from any of said condition register bit locations CA through CN as an indication that the next highest order decimal digit must be modified in accordance with said 'carry' to compensate for the conversion of the decimal digits to, in effect, a hexa-decimal format.

9. A method utilizing an expanded condition register as set forth in claim 7 further including specifying a 'set summary overflow bit' at a first point in an instruction string when it is desired to detect an 'overflow' condition occurring as the result of the execution of any one of a number of successive instructions occurring in the instruction string, any one of which might produce such an 'overflow', said 'summary overflow' bit being set to a '1' if such an overflow occurs, whereby it is not necessary to specify such an operation as a separate instruction following each of said instructions which might have caused said 'overflow'.

10. A method utilizing an expanded condition register as set forth in claim 9 including interrogating the CA bit of said condition register on successive executions of a multiply-step instruction between a multiplier and a multiplicand and forming a partial product of the multiplicand and a 2-bit partial multiplier by a shift and add operation which comprises utilizing the value stored in said CA bit of the condition register which was set by the preceding multiply-step operation, and using the accessed value as the sign bit for a current operation.

11. A method utilizing an expanded condition register as set forth in claim 7 including accessing the overflow bit (OV) of the condition register and utilizing same to indicate, after the first step of a multi step divide instruction has been completed, that the current quotient will not fit into a single register, and accessing and utilizing the condition register bit CA after the last step of said multi step divide instruction in a sequence of such steps to determine the correct remainder.

* * * * *